May 9, 1950
F. E. MINER
2,506,935
CLUTCH DEVICE
Filed Nov. 1, 1947
2 Sheets-Sheet 1
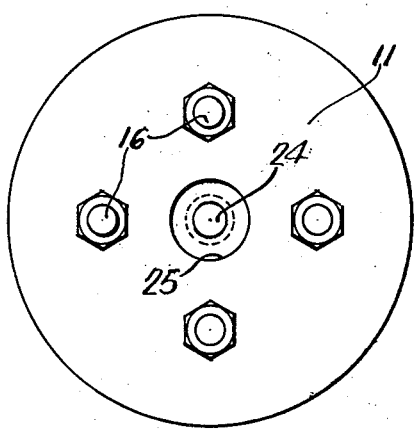
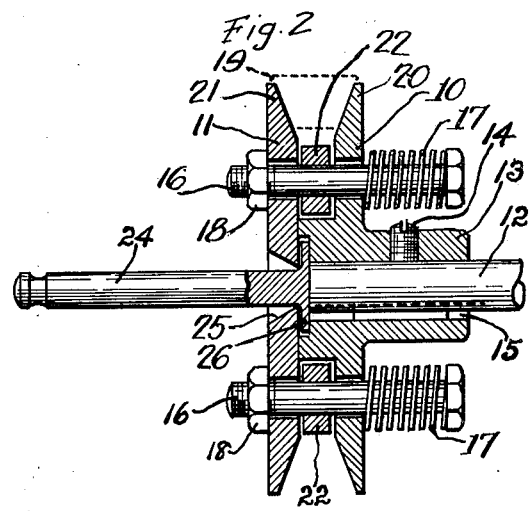
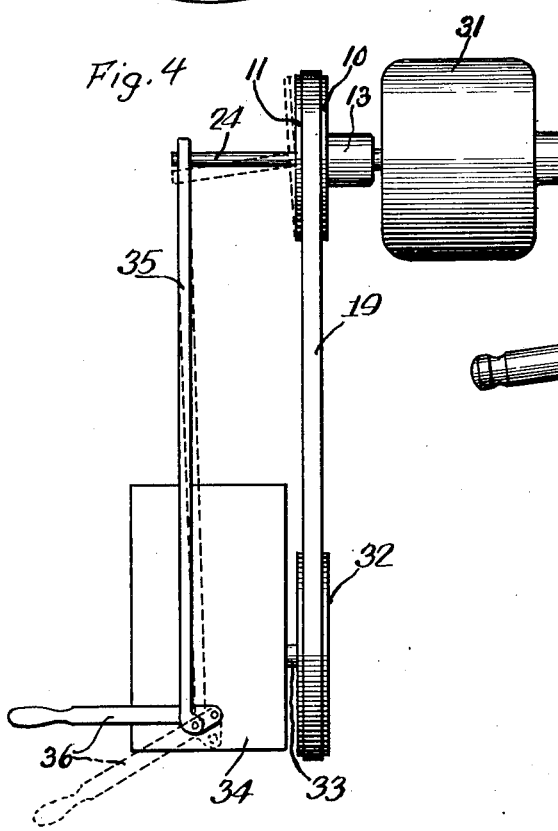
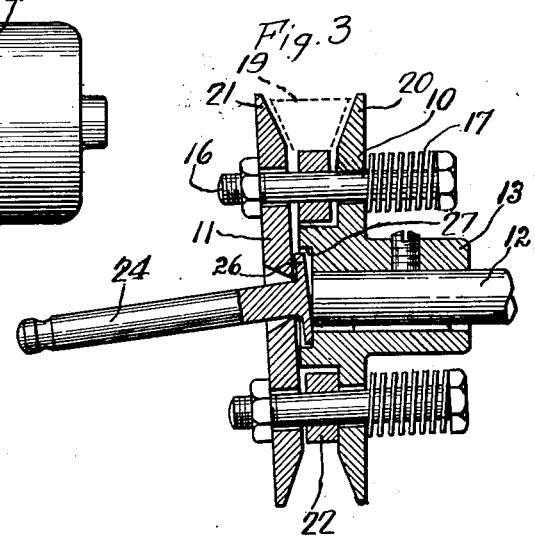
INVENTOR.
Floyd E. Miner
BY
J. Daniel Stuwe
Attorney May 9, 1950  F. E. MINER  2,506,935
CLUTCH DEVICE
Filed Nov. 1, 1947  2 Sheets-Sheet 2
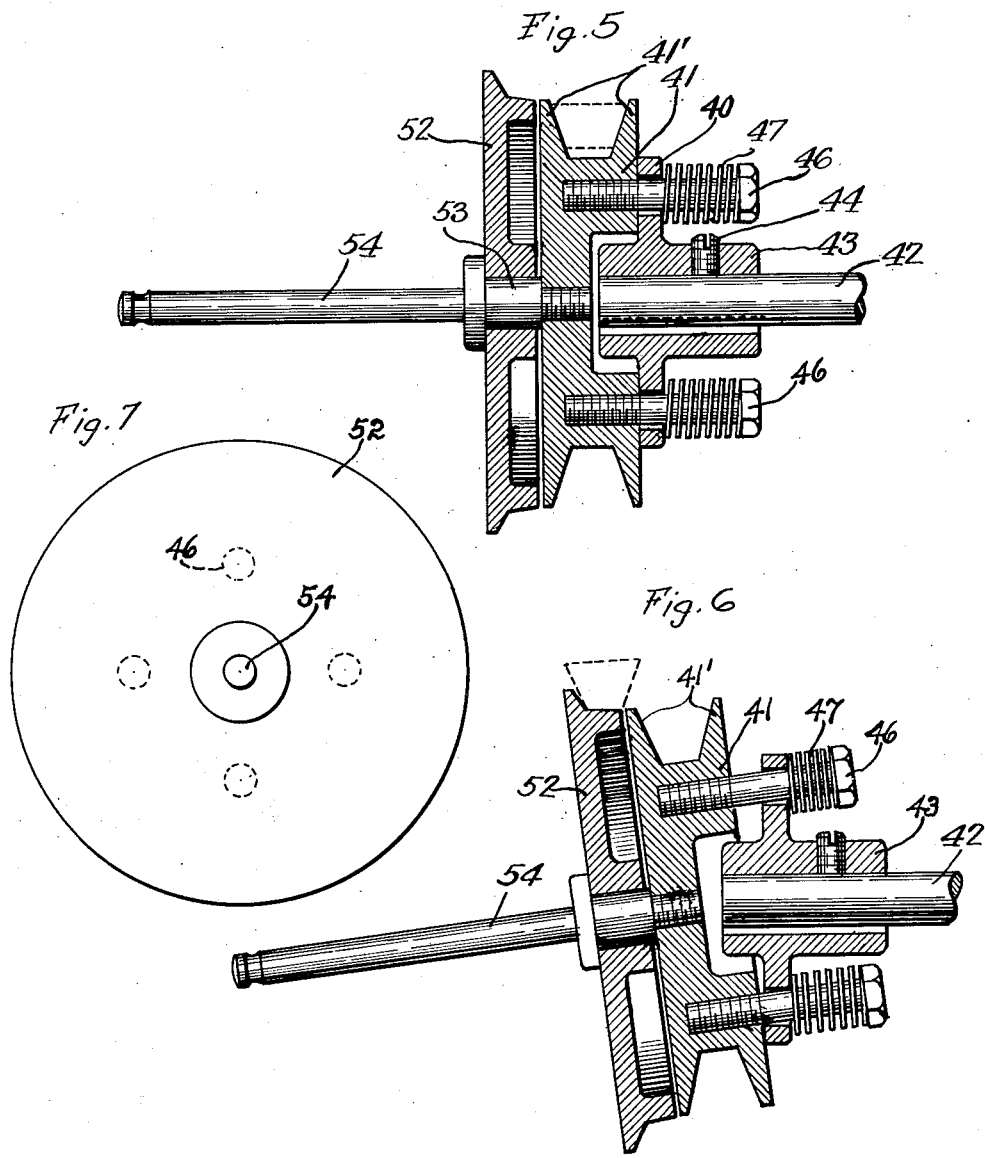
INVENTOR.
BY Floyd E. Miner
J. Daniel Stuwe
Attorney Patented May 9, 1950

2,506,935

UNITED STATES PATENT OFFICE 2,506,935

CLUTCH DEVICE

Floyd E. Miner, Lombard, Ill.

Application November 1, 1947, Serial No. 783,504

8 Claims. (Cl. 74—230.11)

This invention relates to a clutch device, and more particularly to the type which is utilized to cooperate with a flexible endless member, such as a belt or cable or the like.

One of the essential objects of this invention is to provide a novel, compact and durable clutch device arranged to have clasping or driving engagement with an endless member and wherein such engagement is readily releasable.

Another object of this invention is to provide such a clutch device which is rotary and carries the endless member normally in a driving relation on its outer or peripheral part, but is easily operable to release the driving grasp on the member and then carry the member in an idle position.

Another object of this invention is to provide a clutch device containing several coacting driving parts wherein the operative or clasping connection between such parts and the engaged endless member is maintained under normal operative conditions, but is readily released by tilting one of said parts on the other by a simple manipulation.

A more particular object of this invention is to provide such a clutch device by utilizing two companion members which normally rotate together with their axes of rotation alined and clasping a belt operatively by their outer or peripheral parts, and wherein one of said members is tiltable relative to the other to release the driving grasp on the belt and at the same time to enable the latter to move into an idle or inoperative position.

A further object of this invention is to provide such a clutch device wherein the driving connection between the clutch and the belt is normally maintained, but can be readily broken by manual operation, and such driving connection will be automatically resumed as soon as said breaking operation is released.

These and various other objects and advantages are attained with this invention, as will become apparent from the following description, taken in connection with the accompanying drawings; wherein the invention is shown in a few of the preferred forms, it being evident that other arrangements and forms of construction may be resorted to in carrying out the objects and purposes of this invention.

In the drawings:

Fig. 1 is an end elevational view of the clutch device, shown in the preferred form of construction.

Fig. 2 is a central sectional view thereof on its axis of rotation, showing it in the operative position.

Fig. 3 is a similar view, but in its idle position.

Fig. 4 is a plan view illustrating a practical application of this clutch device, showing its operative position in full lines.

Fig. 5 is a central sectional view thru the rotary axis of a modified form of the clutch device, showing it in the operative position.

Fig. 6 is a similar sectional view of this form, but in the idle position.

Fig. 7 is an end view of this form.

In the construction illustrated in the drawings, in both of the forms presented therein, my novel clutch device is shown as being more particularly arranged for use in connection with an endless member which is substantially in the form of a V-shaped belt, and so as to clasp the same and function therewith during operation; but this device is likewise adapted for use with other forms of endless means.

In the form of construction as shown in Figs. 1 to 4 the clutch device comprises two cooperating parts or members 10 and 11, the member 10 being mounted around an operating shaft 12, whereto it is secured with its hub 13 by means of a set screw 14 and by key and slot means 15, so as to rotate therewith. The member 11 is connected with member 10 so as to be rotary therewith but to be yieldably and tiltably joined thereto; and this is conveniently accomplished by the use of bolts or elements 16 extending thru openings provided in the members 10 and 11, as shown in the drawings, springs 17 being provided on said bolts for yieldably but firmly retaining said members 10 and 11 close together in the operative position. Securing nuts 18 on the ends of said bolts are adjustable thereon, and allow for adjustment of the spring tension.

The endless flexible means 19 herein is shown in the form of a V-shaped belt, and the clutch members 10 and 11 are therefore provided with beveled portions 20 and 21 on their outer or peripheral parts, so arranged as to engage or clasp the belt 19 normally therebetween in driving relation, as indicated in Fig. 2 of the drawings. These members 10 and 11 are substantially disc-shaped on their main outer parts, around their central hub 13; and thereby idling elements or rollers 22 can be conveniently mounted rotary on the bolts 16, outward of said hub, adapted to receive the belt 19 thereon in the idling or inoperative position, as shown in Fig. 3 of the drawings.

The means provided herein for moving the clutch device from its operative to its inoperative position includes a control shaft or stem 24 which extends from an opening 25 provided centrally in member 11, and which has an actuating or tilting head 26 on its inner end, seated in a notch or pocket 27 provided at the end of hub 13, so as to fit snugly therein during operation of the device, as shown in Fig. 2.

It may be noted that in the driving or operating position this control shaft or stem 24 is alined longitudinally with the operating shaft 12, so that the two shafts along with the members 10 and 11 thereon have their axes of rotation in alinement; while during this time the springs 17 hold the beveled outer parts 20 and 21 of said members firmly in clasping or operative engagement with the belt 19.

In order to move this clutch device from the operative position, as seen in Fig. 2, to the inoperative position, as seen in Fig. 3, it is merely necessary to actuate the control stem 24 to a tilting position, so that its head 26 is tilted in the pocket 27 and thereby forces the belt-clasping beveled part 21 of member 11 outwardly away from the part 20 on member 10, and thereby releases the clasping engagement on the belt, as shown in Fig. 3. By this action the belt is enabled to move onto the idlers or rollers 22, into its idle position, and let them rotate underneath the belt while the belt remains inoperative.

It may also be noted that herein, as soon as the tilting stress on the stem 24 is released, the springs 17 will automatically force the beveled parts 20 and 21 toward one another into clasping or operative relation with the belt.

In Fig. 4 a practical application of this clutch device is shown. Therein the clutch member 10 with the operating shaft 12 are shown as the drive member and the drive shaft, respectively, being driven by a suitable power supplying means or motor 31. The device is indicated as driving, thru the belt 19, a pulley 32 adapted to actuate, thru its shaft 33, any suitable mechanism housed in the casing 34. A link 35 has one end connected to the outer end of the stem 24, preferably so as to allow for rotation of the stem therein, while a control lever 36 is indicated herein as mounted on the casing 34, whereby to actuate the link and tilt the stem to move the clutch device into the inoperative position.

It will be apparent that such driving arrangement may likewise be reversed, to have the drive shaft or any suitable driving means connected to the pulley 32; while this clutch device is then connected with some driven means in place of the driving motor 31, whereby the shaft 12 and the clutch member 10 then become the driven members.

This invention is readily adapted to be provided in various forms and modifications, and in Figs. 5, 6 and 7 one such modified form is shown. This form, like the preceding one, comprises an operating part or member 40 and the companion part 41. Part 40 herein also has its hub 43 secured by a set screw 44 to the operating shaft 42, like in the above described form. Bolts 46 extend thru openings in the disc-like part of member 40 and extend into the companion member 41, but the latter is substantially pulley-shaped and contains both beveled peripheral or outer portions 41' for receiving the V-shaped belt therebetween during operation of the device. Springs 47 on bolts 46 also serve to urge the clutch members normally into their operative position. However, the idling means herein is in the shape of a flanged member or idling pulley 52 mounted at the outward side of clutch member 41, being preferably mounted rotary on a boss 53 provided on the control shaft or stem 54 which has its inner end secured centrally in member 41.

It will appear evident that in this form, like in the preceding form of the invention, the operating shaft 42 with its clutch member 40 fixed thereon are positioned to have the axes of rotation alined with the axes of rotation of the control shaft or stem 54 and the clutch member 41 fixed on the stem, while in the operative position; and that by actuating and tilting said stem 54 the clutch member 41 may be tilted, and therewith the flanged idler 52, into an inoperative position, so as to facilitate and enable movement of the belt from clutch member 41 onto the flanged idler 52, as indicated in Fig. 6 of the drawings. Such outwardly sliding release movement of the belt is facilitated by the traveling belt and the rotation of member 41 while its belt-engaging portion is tilted outwardly, as is well known in this art. When the tilting force on the control stem is released, the springs 47 will automatically return the clutch parts and idler to the operative position, with the shafts and parts again in axial alinement, and the belt is then enabled to move back from the idler 52 onto member 41 in the operative position.

In either of these forms the readily manipulated tilting action of the control stem tilts the associated controlled part of the clutch (11, 41), relative to the operating part thereof (10, 40); and thereby enables and provides for the release movement of the belt, from the clasped operative position to the inoperative position on the idler.

This construction, in either of its forms, thus provides a readily actuated and also durable and inexpensive clutch mechanism of the pulley-type for coaction with flexible endless means, as a belt or the like, to have driving engagement therewith normally but to be easily releasable therefrom.

I claim:

1. In a clutch device constructed for carrying endless flexible means thereon, the improvement which comprises a driving clutch part and a driven clutch part which normally coact to have driving engagement with the flexible means during operation of the device, means mounting said parts to have their axes of rotation alined while coacting with the flexible means, idling means on said device for receiving the flexible means while the latter and the parts are out of driving relation, and means operable for tilting one of said clutch parts out of axial alinement with the other part, to transfer said flexible means from its driving position on said parts to said idling means.

2. In a clutch device of the type described, a pair of rotary companion members and means for mounting them to have their axes of rotation alined and to have driving engagement with endless flexible means during operation of the device, idling means cooperating with said members, and control means operable for tilting one of said members relative to the other member to release the driving connection thereof with the flexible means and facilitate movement of the latter from its operative position onto said idling means, the construction being arranged and positioned so that when the control means is released said flexible means will automatically return from the idling means to the operative position on said members.

3. In a device of the type described, a pair of rotary members and means for mounting them with their axes of rotation alined and adapted to grasp a belt operably between their peripheral portions, idling means carried by one of said members, and means operable for tilting one of the members on the other and separate their belt-grasping portions, whereby to release their grasp on the belt and at the same time facilitate its movement from said grasping portions into its inoperative position on the idling means.

4. In a device of the type described, a pair of substantially disc-like members and a shaft connected with each member and providing an axis of rotation for the member, elements operably connecting said members for normally holding them yieldably together with their axes of rotation alined and their outer portions adapted to grasp a belt operatively therebetween, idling means mounted rotatively on said elements to receive the belt in its inoperative position, and control means including one of said shafts arranged for tilting this shaft and its connected member relative to the other member, whereby to release the grasping engagement of said members with said belt and facilitate its movement from their outer portions onto the idling means.

5. In a device of the class described, a pair of substantially disc-like members, a pair of shafts one connected with each of said members and providing an axis of rotation therefor, elements extending thru said members and having resilient means thereon to normally retain said members in the operative position and their axes of rotation alined, with the outer portions of said members arranged to grasp a belt therebetween, idling rollers mounted on said elements between said members, and means including one of said shafts operable for tilting this shaft and its connected member relative to the other shaft and member, whereby to release the grasping engagement of said members with the belt and enable the latter to move from said outer grasping portions onto said idling rollers.

6. In a clutch device of the type described, a pair of cooperating members and means for mounting them to rotate together, means normally retaining them close together with their axes of rotation alined, one of said members being substantially pulley-shaped arranged to carry a belt in driving engagement thereon, idling means on the side of the latter member, and means operable to tilt said latter member relative to the other member and thereby facilitate movement of the belt from its driving position to an inactive position on said idling means.

7. The subject matter included in claim 6, and wherein each of said members has a shaft secured thereto to provide its axis of rotation, while one of the shafts provides part of the control means operated in tilting said shaft and its connected member relative to the other member and shaft to the inoperative position.

8. In a clutch device arranged and constructed to carry a belt thereon, the improvement which comprises a pair of rotary members mounted to have their axes of rotation in alinement during operation of the device, idling means for receiving and supporting the belt in the inoperative position of the device, and control means including a tiltable shaft connected to one of said pair of rotary members whereby this member is tilted on the other member to induce movement of the belt from its operative to its inoperative position.

FLOYD E. MINER.

REFERENCES CITED

The following references are of record in the file of this patent:

UNITED STATES PATENTS

| Number | Name | Date |
| --- | --- | --- |
| 867,466 | Bailey | Oct. 1, 1907 |
| 1,264,742 | Aldrich | Apr. 30, 1918 |
| 2,180,065 | O'Brien | Nov. 14, 1939 |
| 2,180,217 | Thomas | Nov. 14, 1939 |
| 2,209,736 | Livingston | July 30, 1940 |